US011642773B2

(12) United States Patent
Bathke et al.

(10) Patent No.: US 11,642,773 B2
(45) Date of Patent: May 9, 2023

(54) HANDHELD WORK APPARATUS (71) Applicant: Andreas Stihl AG & Co. KG, Waiblingen (DE)

(72) Inventors: Lars Bathke, Rudersberg (DE); Markus Oesterle, Althuette (DE); Jonathan Seiz, Stuttgart (DE); Verena Mann, Remshalden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/483,263

(22) Filed: Sep. 23, 2021

(65) Prior Publication Data
US 2022/0088763 A1 Mar. 24, 2022

(30) Foreign Application Priority Data

Sep. 23, 2020 (EP) ..................... 20197811

(51) Int. Cl.
*B25F 5/02* (2006.01)
*B23D 51/01* (2006.01)

(52) U.S. Cl.
CPC ............. *B25F 5/026* (2013.01); *B23D 51/01* (2013.01)

(58) Field of Classification Search
CPC ................ B23D 51/01; B25F 5/026
See application file for complete search history.

(56) References Cited

U.S. PATENT DOCUMENTS

| 4,432,139 A * | 2/1984 | Kohler | B27B 17/083 |
| | | | 30/381 |
| 5,407,381 A * | 4/1995 | Schaefer | B24B 23/028 |
| | | | 451/344 |
| 2013/0025088 A1* | 1/2013 | Weiss | B25D 17/043 |
| | | | 16/431 |
| 2014/0013542 A1 | 1/2014 | Wang | |
| 2014/0331809 A1 | 11/2014 | Mikula et al. | |

FOREIGN PATENT DOCUMENTS

| CN | 102145486 B | 12/2014 | |
| WO | 2018/168421 A1 | 9/2018 | |
| WO | WO2018168421 A1 * | 9/2018 | ............. B24B 23/00 |

* cited by examiner

*Primary Examiner* — Andrew M Tecco
*Assistant Examiner* — Nicholas E Igbokwe
(74) *Attorney, Agent, or Firm* — Walter Ottesen, P.A.

(57) ABSTRACT

The disclosure relates to a handheld work apparatus, wherein the work apparatus includes a housing, a drive motor for driving a tool, and a handle disposed on the housing. A contour is provided on the handle and a counter contour is provided on the housing. In the inoperative position of the handle, a minimum friction torque ($M_1$) which acts about the pivot axis is provided between the handle and the housing. In the operative position of the handle, the contour and the counter contour are operatively connected in such a manner that a further friction torque ($M_2$) which acts about the pivot axis is present between the handle and the housing. The further friction torque ($M_2$) in the operative position is greater than the minimum friction torque ($M_1$) in the inoperative position.

16 Claims, 7 Drawing Sheets

HANDHELD WORK APPARATUS

CROSS REFERENCE TO RELATED APPLICATION

This application claims priority of European patent application no. 20 197 811.1, filed Sep. 23, 2020, the entire content of which is incorporated herein by reference.

BACKGROUND

Handheld work apparatuses which have a housing and a handle which is pivotable on the housing are known. The handle is connected to the housing by way of a rotary joint which is formed by a lug and a lug receptacle. An annular seal which has the effect of compensating play, and as a result avoids tilting of the handle in relation to the housing when the handle is rotated, is disposed between the lug and the lug receptacle. The annular seal has a damping effect when rotating the handle in relation to the housing, as a result of which the operator experiences a high-quality feel. In configurations of the rotary joint of such a type it is disadvantageous that the rotary joint tightens as a result of contamination occurring between the housing and the handle. This situation has a disadvantageous effect both in terms of the feel of the work apparatus and in terms of the rotary function.

SUMMARY

It is an object of the disclosure to refine a work apparatus in such a manner that the feel when rotating the handle is enhanced and a high degree of functionality of the work apparatus is guaranteed at the same time.

This object can, for example, be achieved by a work apparatus including a housing; a drive motor for driving a tool; a handle disposed on the housing and mounted on the housing so as to be pivotable about a pivot axis, wherein the handle is pivotable to an operative position and to an inoperative position; a contour disposed on the handle; a counter contour disposed on the housing; the contour and the counter contour being configured such that when the handle is in the inoperative position, a minimum friction torque $M_1$, which acts about the pivot axis, is provided between the handle and the housing; the contour and the counter contour being further configured such that when the handle is in the operative position, the contour and the counter contour are operatively connected in such a manner that a further friction torque $M_2$, which acts about the pivot axis, is present between the handle and the housing; and, the further friction torque $M_2$ in the operative position is greater than the minimum friction torque $M_1$ in the inoperative position.

A handheld work apparatus according to an embodiment of the disclosure includes a handle disposed on the housing, the handle being mounted on the housing so as to be pivotable about a pivot axis. The handle is pivotable to at least one operative position and to at least one inoperative position. A contour is provided on the handle, and a counter contour is provided on the housing. The contour and the counter contour are configured in such a manner that in the inoperative position of the handle, a minimum friction torque which acts about the pivot axis is provided between the handle and the housing, and in the operative position of the handle, the contour and the counter contour are operatively connected in such a manner that a further friction torque which acts about the pivot axis is present between the handle and the housing. The further friction torque in the operative position is greater than the minimum friction torque in the inoperative position. When the operator rotates the handle about the pivot axis, the operator has to apply an increased friction torque in order to reach the operative position. As the torque increases, it is thus imparted to the operator that the latter is approaching the operative position. This effect allows the operator to experience a high-quality feel of the work apparatus. The term friction torque is to be understood to be a potential torque that via the contour and the counter contour is able to be transmitted between the handle and the housing.

It can advantageously be provided that in the inoperative position of the handle, a bearing play is provided between the handle and the housing, and in the operative position of the handle, the contour and the counter contour are operatively connected in such a manner that the housing and the handle are mutually braced. As a result of the bearing play between the handle and the housing it is suggested to the operator that the work apparatus is not yet ready for operation. Furthermore, the handle and the housing in the inoperative position are more easily pivoted in relation to one another. The housing and the handle are mutually braced only by rotating the handle to the operative position. As a result, the handle and the housing are mutually fixed, as a result of which a high-quality feel is imparted and an operative position of the work apparatus is suggested to the operator.

The bearing play, in terms of the pivot axis, can preferably be a radial bearing play. In the operative position of the handle, the bearing play can preferably be cancelled as a result of the interaction between the contour of the handle and the counter contour of the housing. Any contamination between the housing and the handle can be released as a result of the bearing play in the inoperative position. It is thus avoided that any contamination between the handle and the housing leads to a blockage when pivoting the handle.

The contour can be configured as a projection on the handle. The counter contour is in particular configured as a housing projection. It can be provided that the contact faces of the contour and the counter contour that are operatively connected to one another are mutually configured in such a manner that the friction torque is increased when the handle is pivoted from the inoperative position to the operative position. Accordingly, the projection of the handle and the housing projection contact one another, as a result of which only partial contact is established between the handle and the housing. This partial contact can be configured in an arbitrary manner as a result of the configurations of the projections, as a result of which the friction torque to be transmitted can be set. For example, as a result of the configurations of the projections, the friction torque can be set as a function of the rotational angle of the handle in relation to the housing. The degree of bracing, and thus the size of the friction torque, can be set as a result of the height of the projection of the handle and of the housing projection.

The mutual bearing of the housing and the handle can preferably be formed by a lug which is mounted in the receptacle. The lug can preferably be configured on the handle, and the receptacle is in particular configured on the housing. The pivoting capability of the handle in relation to the housing is thus enabled by the receptacle and the lug. The receptacle and the lug thus form a radial bearing.

It can advantageously be provided that at least two, in particular at least three, preferably at least four, contours are provided on the handle. Any other number of contours on the other handle can also be expedient. The contours on the handle can preferably be disposed so as to be mutually offset at a uniform angular spacing. The number of contours can preferably correspond to the number of counter contours. When the contours and the counter contours are uniformly mutually offset, an increase of the friction force is also enabled as the number of contours increases. By increasing the number of contours, it is furthermore also possible for the contours to be reduced in terms of the radial elevation thereof and for the wear on the material to be reduced when the counter contour and the contour engage with one another. The number of contours can preferably be adapted to the number of operative positions of the handle.

It can advantageously be provided that a blocking device is provided for locking the handle in the operative position, the blocking device being configured separately from the contour and the counter contour. Accordingly, the contour and the counter contour are configured in such a manner that the increase in friction, or the bracing of the housing and the handle, respectively, is generated when the separately configured blocking device is also in a latched position. Accordingly, the contour and the counter contour are configured in such a manner that in the operative position of the handle, the contour and the counter contour can preferably engage in the case of a locked blocking device.

BRIEF DESCRIPTION OF THE DRAWINGS

The invention will now be described with reference to the drawings wherein.

DESCRIPTION OF THE PREFERRED EMBODIMENTS

Figure 1:
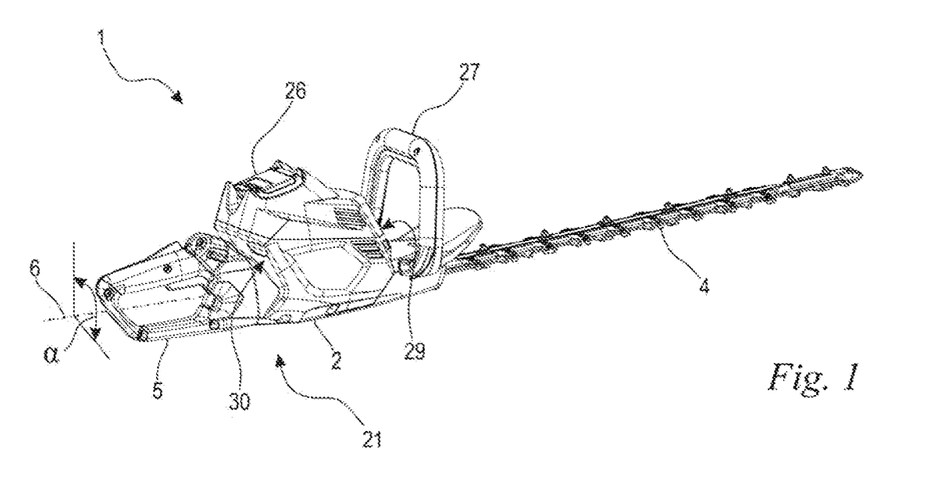
FIG. 1 in a perspective illustration shows a handheld work apparatus according to the disclosure in a non-pivoted operative position of the handle.

Shown in FIG. 1 is a handheld work apparatus 1 which in the present embodiment is configured as a hedge cutter. The work apparatus 1 includes a housing 2 in which a schematically illustrated drive motor 3 is disposed. The drive motor 3 drives a tool 4 which in the embodiment is configured as a cutting blade and protrudes from the housing 2. The drive motor 3 is configured as an electric motor and supplied with power by way of a battery pack 26 as the energy source. In an alternative embodiment of the work apparatus 1 the drive motor 3 can also be configured as an internal combustion engine.

As is shown in FIG. 1, a front handle 27, shaped like a stirrup, is established on the housing 2. The front handle 27 is disposed in a region between the housing 2 and the tool 4 and spans the tool 4. A hand protection 28 which extends approximately between the front handle 27 and the tool 4 is disposed on the housing 2 on a side 29 that faces the tool 4.

Figure 4:
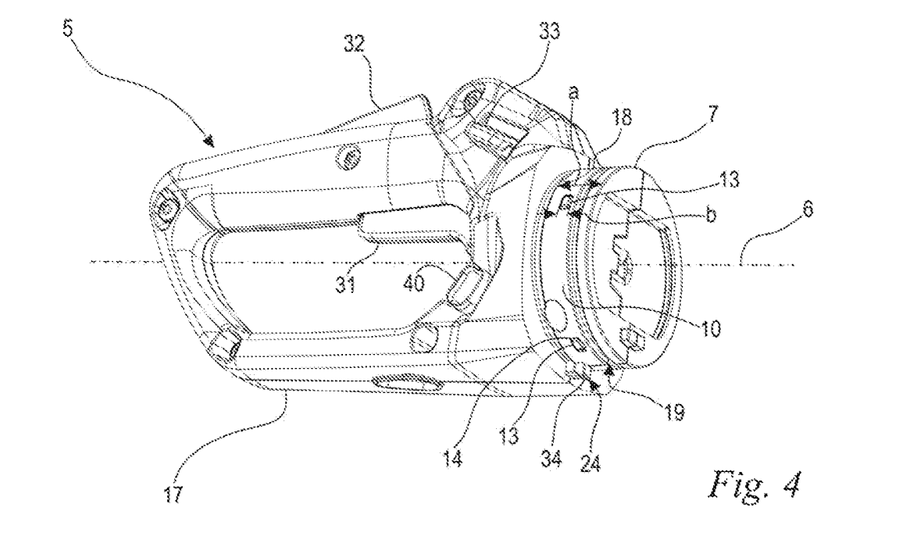
FIG. 4 in a perspective illustration shows the handle.

As is shown in FIG. 1, a rear handle, hereunder referred to as the handle 5, is disposed on the side 30 of the housing 2 that faces away from the tool 4. As is also shown in FIG. 4, the handle 5 has a closed base body 17. The base body 17 of the handle 5 in an alternative configuration can also be configured so as to be open, the handle 5 accordingly having a free end. The base body 17 of the handle 5 in an embodiment is configured in multiple parts, specifically from two gripping clamshells which can preferably be screwed to one another. The handle 5 includes an operator-controlled lever 31 for controlling the motor output, and a first locking lever 32 and a second locking lever 33 for releasing the operator-controlled lever 31. The handle 5 is mounted via a bearing 9 on the housing 2 so as to be pivotable about a pivot axis 6. The bearing 9 is formed by a receptacle 8 on the housing 2, a lug 7 of the handle 5 protruding into the receptacle 8. In an alternative embodiment of the work apparatus 1, it may also be expedient for the receptacle 8 to be provided on the handle 5 and for the lug 7 to be provided on the housing 2. In order for the handle 5 to be assembled on the housing 2, the housing 2 in the embodiment is configured in two parts. The separation plane of the housing 2 lies in a vertical plane 60 of the work apparatus 1, the vertical plane 60 running through the pivot axis 6 and, in a position of the work apparatus 1 placed on flat ground, running in the direction of gravity. The work apparatus furthermore includes a horizontal plane 61 which runs so as to be perpendicular to the vertical plane 60. In an alternative configuration of the work apparatus 1, the separation plane of the housing 2 is merely disposed so as to be parallel to the vertical plane 60. It can also be expedient for the separation plane to be disposed so as to be rotated about the pivot axis 6 in relation to the vertical plane 60.

Figure 5:
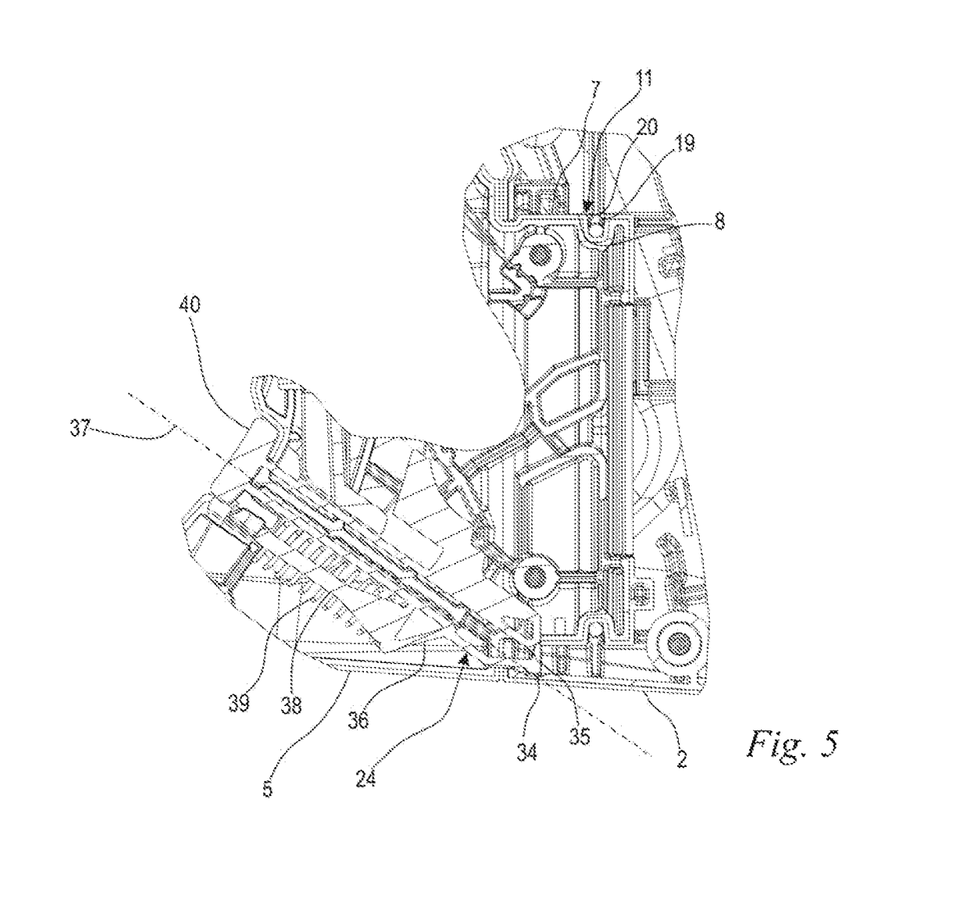
FIG. 5 in a fragmented sectional illustration of the work apparatus shows the blocking device.

As is shown in FIG. 4, the lug 7 is configured so as to be substantially cylindrical, wherein the cylinder axis corresponds to the pivot axis 6 of the handle 5. The cylindrical lug 7 possesses a cylindrical surface 18 which serves as a radial support, in terms of the pivot axis 6, in relation to an inner surface 43 of the receptacle 8 of the housing 2. The cylindrical surface 18 of the lug 7 conjointly with the inner surface 43 of the receptacle 8 thus forms a radial bearing 10 between the handle 5 and the housing 2. The lug 7 furthermore includes a groove 19 which is configured in the cylindrical surface 18 of the lug 7. The groove 19 can preferably completely encircle the lug 7 and is configured on the lug 7 so as to be coaxial with the pivot axis 6. A shoulder 20 which engages in the groove 19 is provided on the receptacle 8 of the housing 2 (FIG. 5). The groove 19 and the engaging shoulder 20 form, in the direction of the pivot axis 6, a form-fitting connection as a result of which the handle 5 is supported in relation to the housing 2 in the axial direction. In an alternative embodiment of the work apparatus it may be expedient for the groove 19 to be provided in the housing 2 and for the shoulder 20 to be provided on the lug 7. The groove 19 of the lug 7 and the shoulder 20 of the receptacle 8 that engages in the groove 19 of the lug 7 thus form an axial bearing 11 between the handle 5 and the housing 2.

Figure 2:
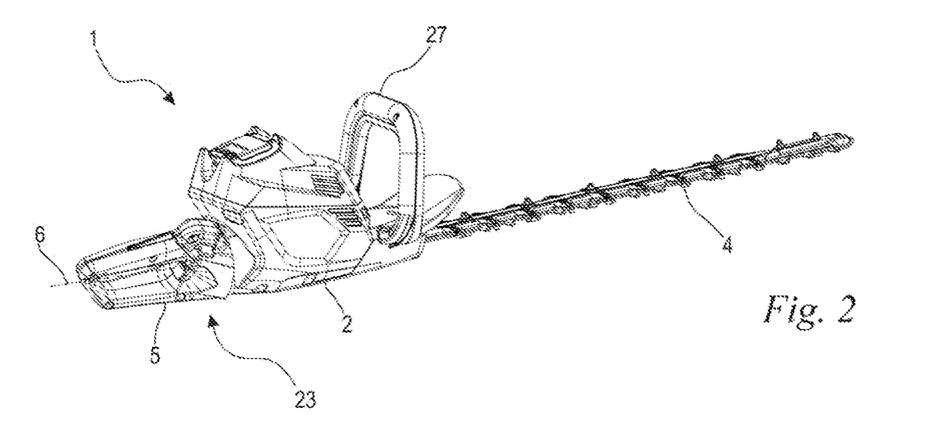
FIG. 2 in a perspective illustration shows the handheld work apparatus as per FIG. 1 in an inoperative position of the handle.
Figure 3:
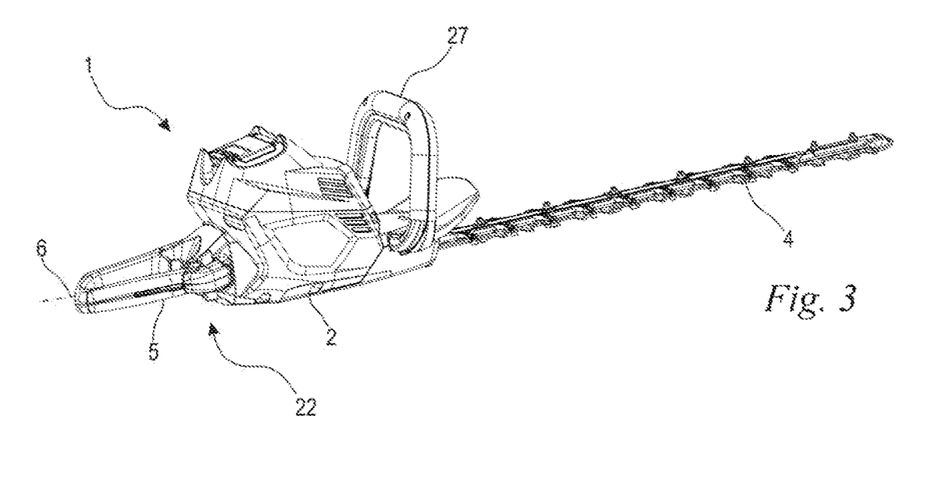
FIG. 3 in a perspective illustration shows the handheld work apparatus as per FIG. 1 in a pivoted operative position.

As is shown in FIGS. 1 to 3, the handle 5 is mounted so as to be pivotable about the pivot axis 6 on the housing 2. The handle 5 is pivotable from a first operative position 21, shown in FIG. 1, to a second operative position 22, shown in FIG. 3. In the first operative position 21 of the handle 5, preferably horizontal cuts can be performed, for example for cutting the approximately horizontally running upper side of a hedge. In the second operative position 22, the handle 5, proceeding from the first operative position 21, is pivoted by an angle α (FIG. 8), measured about the pivot axis 6, of approximately 90°. In an alternative embodiment of the work apparatus 1, it can be provided that the handle 5 is to be pivoted about an angle α of approximately 45° in order to reach the second operative position 22 from the first operative position 21. In this second operative position 22, preferably vertical cuts can be performed, for example on vertically running external sides of a hedge. When the handle 5 is being pivoted from the first operative position 21 to the second operative position 22, the handle 5 is situated in an inoperative position 23. The operation of the work apparatus 1 is not possible in the inoperative position 23.

As is shown in FIG. 4, the work apparatus 1 includes a blocking device 24. The blocking device 24 is provided for locking the handle 5 in an operative position 21, 22. As is shown in FIG. 5, the blocking device 24 includes at least two locking receptacles 35 which are provided in the housing 2, and at least one locking contour 34 which in the operative position 21, 22 interacts with one of the locking receptacles 35. The locking contour 34 is disposed on one end of a blocking member 36. The blocking member 36 possesses a longitudinal axis 37 in which the blocking member 36 is mounted so as to be displaceable in the handle 5. It may be expedient for the blocking member 36 to be rotatably configured. The handle 5 includes a spring element 39, wherein the spring element 39 tensions the blocking member 36 in the direction toward the locking receptacle 35, in particular in relation to the locking receptacle 35 of the housing 2. The spring element 39, by way of one end, is supported on a spring receptacle 38 of the blocking member 36. The spring receptacle 38 is configured in the shape of a lug. In the embodiment, the spring receptacle 38 is configured so as to be integral to the blocking member 36. The spring element 39, by way of the other end, is supported in relation to the handle 5. The spring element 39 in the embodiment is configured as a coil spring. However, other configurations of the spring element 39 or of the spring receptacle 38 may also be expedient.

The blocking device 24 is shown in a locked position in FIG. 5. Accordingly, the blocking member 36, while supported by the spring element 39 on the handle 5, is tensioned in the direction toward the housing 2, as a result of which the locking contour 34 of the blocking member 36 is tensioned into the locking receptacle 35 of the housing 2. The locking contour 34 and the locking receptacle 35 in the direction about the pivot axis 6 form a form-fitting connection, as a result of which a relative rotation between the handle 5 and the housing 2 about the pivot axis 6 is blocked. In order for the blocking device 24 to be unlatched, the blocking member 36 is to be pulled away, counter to the spring force of the spring element 39, in the direction away from the housing 2. To this end, a planar retaining support 40 is configured on the other end of the blocking member 36. The retaining support 40 can preferably be configured so as to be integral to the blocking member 36. The retaining support 40 is configured in such a manner that the retaining support 40 can be encompassed by the hand of the operator of the work apparatus 1, as a result of which the blocking member 36 can be pulled, counter to the spring force of the spring element 39, out of the locking receptacle 35 of the housing 2. The form-fitting connection between the locking contour 34 and the locking receptacle 35 is cancelled. The blocking device 24 is situated in a released position, as a result of which the handle 5 is pivotable relative to the housing 2.

Figure 6:
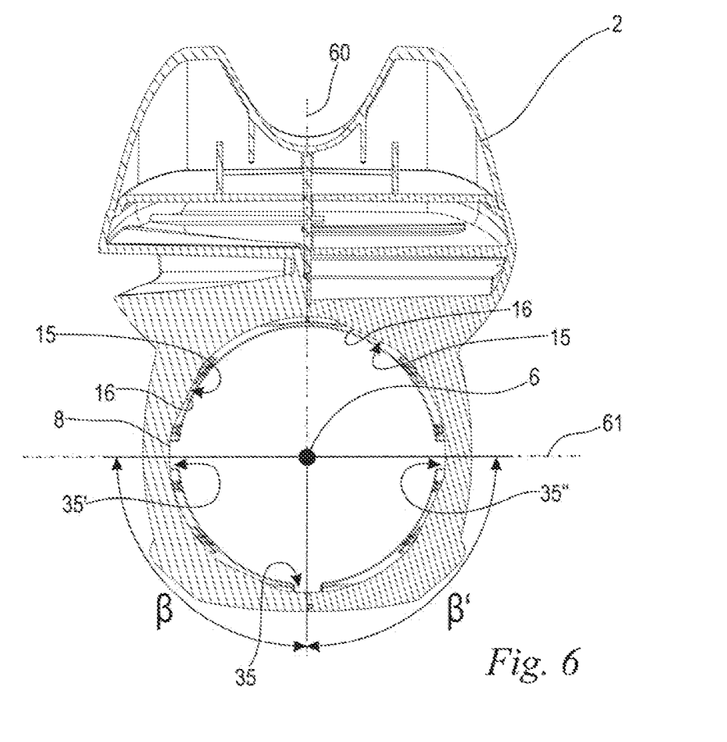
FIG. 6 in a sectional illustration of the housing shows the locking receptacles of the blocking device.

As is shown in FIG. 6, the blocking device 24 includes three locking receptacles 35, 35', 35" which are configured on the housing 2. The locking receptacles 35, 35', 35" in the embodiment are disposed directly in the receptacle 8 of the housing 2. However, it may also be expedient for the locking receptacles 35, 35', 35" to be provided in another region of the housing 2. The locking receptacles 35, 35', 35" are configured as a recess in the housing 2. A first locking receptacle 35 is disposed between the second locking receptacle 35' and a third locking receptacle 35". The first locking receptacle 35, in relation to the second locking receptacle 35' and the third locking receptacle 35", possesses in each case an angular spacing measured about the pivot axis 6, of 30 to 120°, in particular of 80 to 100°, preferably of approximately 90°, advantageously of 30 to 60°, in particular of approximately 45°. The angular spacing β, β', between the first locking receptacle 35 and the adjacent locking receptacles 35', 35" in the embodiment is identical. In an alternative embodiment of the work apparatus it may also be expedient for different angular spacings to be provided. In the embodiment, the first locking receptacle 35 is disposed on a bottom side 41 of the housing 2. The first locking receptacle 35 lies in the vertical plane of the housing 2. In the embodiment, the second locking receptacle 35' and the third locking receptacle 35" are disposed so as to be mutually symmetrical.

Figures 8, 9:
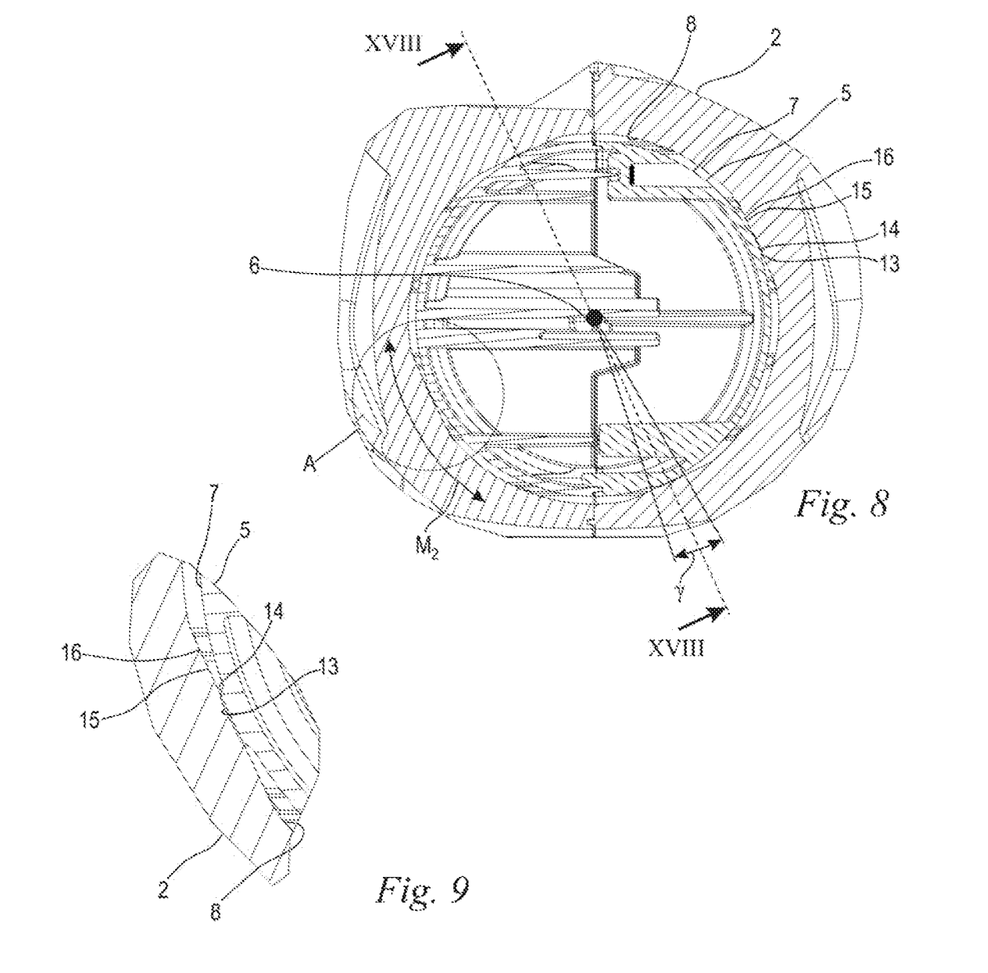
FIG. 8 in a sectional illustration along the arrows XIII in FIG. 7 shows the handheld work apparatus.
FIG. 9 in a fragmented sectional illustration shows the contour of the handle and the counter contour of the housing as per fragment A in FIG. 8.

As is shown in FIGS. 4, 8 and 9, the handle 5 includes at least one contour 13 which in the operative position 21, 22 interacts with at least one counter contour 15 that is configured on the housing 2. In the embodiment, the at least one contour 13 is configured on the lug 7, in particular on the cylindrical surface 18 of the lug 7 (FIG. 4). In an alternative embodiment of the work apparatus, it may also be expedient for the contour 13 to be provided at a different location of the handle 5. The counter contour 15 in the embodiment is configured in the receptacle 8, in particular on the inner surface 43 of the receptacle 8 (FIG. 6). As is shown in FIG. 4, the contour 13 is configured as a projection 14. Accordingly, the projection 14 forms an elevation on the cylindrical surface 18 of the lug 7, the elevation, proceeding from the pivot axis 6, extending in the radial direction. The contour 13 in the circumferential direction of the pivot axis 6 extends across an angle γ, wherein the angle γ is preferably 5 to 25°, in particular 5 to 15°. In an alternative embodiment, the contour 13 can also extend across a smaller angle γ, for example when the contour 13 is configured only as a tip. In the embodiment, the contour 13 extends, so as to be parallel to the pivot axis 6, across a length b which can preferably correspond to at least 10%, in particular at least 20%, preferably approximately 25%, of an axial length a of the lug 7. In an alternative embodiment of the work apparatus 1, other dimensions of the contour 13 may also be expedient.

Figure 18:
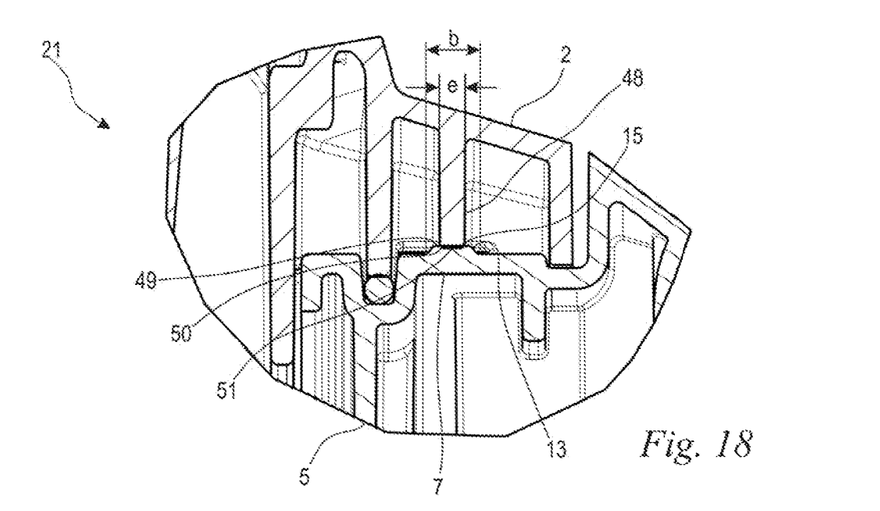

As is shown in FIG. 18, the counter contour 15 is disposed on a rib 48 of the housing 2. The counter contour 15 is configured on the inner side of the rib 48 that faces the lug 7. The counter contour 15 extends across a width e that is measured in the direction of the pivot axis 6. The width e of the counter contour in the embodiment can preferably correspond to the width of the rib 48 that is measured in the direction of the pivot axis 6. The width b of the contour 13 of the handle 5 can preferably be larger than the width e of the counter contour 15. In the embodiment, the width e of the counter contour 15 is in a range of in particular 20 to 80%, preferably 30 to 60%, of the width b of the contour 13. As is shown in FIG. 18, the contour 13 has an end face 49 that faces the rib 48. The counter contour 15 likewise has an end face 50 that faces the lug 7. In the operative position 21, the end face 49 of the contour 13 and the end face 50 of the counter contour 15 are in planar contact and form a common contact surface 51.

As is shown in FIGS. 4 and 8, the handle 5 includes four contours 13. Mutually adjacent contours 13 can preferably be mutually disposed at an identical angular spacing in terms of the pivot axis 6. It may be expedient for only one contour 13, in particular two contours 13, preferably three contours 13, or more than four contours 13 to be provided.

As is shown in FIG. 6, the counter contour 15 is configured as a housing projection 14. The receptacle 8 of the housing 2 is configured so as to be substantially cylindrical. The counter contour 15 forms a deviation from the cylindrical receptacle 8 in the form of a chord. The counter contour 15, in terms of the pivot axis 6, here extends in the direction toward the pivot axis 6. In the embodiment, four counter contours 15 are likewise provided in a manner analogous to the contours 13 on the handle 5. It may also be expedient for a different number of counter contours 15 to be provided. The counter contours 15 are configured on the receptacle 8 in such a manner that adjacent counter contours 15 can preferably have identical mutual angular spacings in the circumferential direction of the pivot axis 6.

Figure 7:
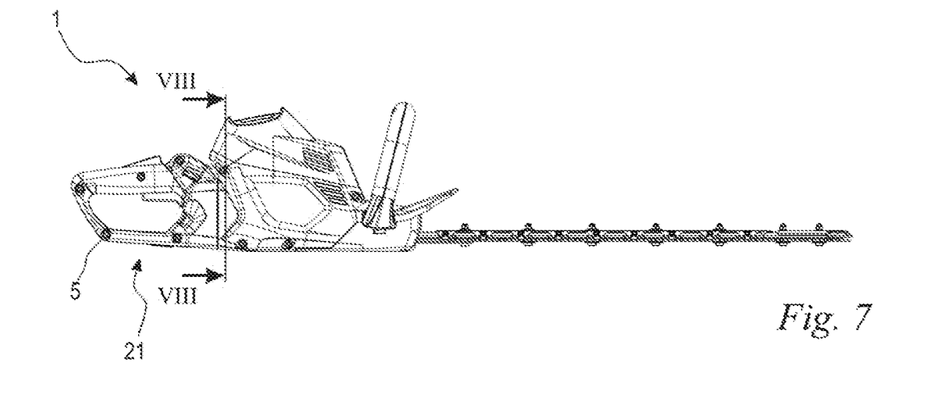
FIG. 7 in a lateral illustration shows the handheld work apparatus as per FIG. 1 in a first operative position.
Figure 11:
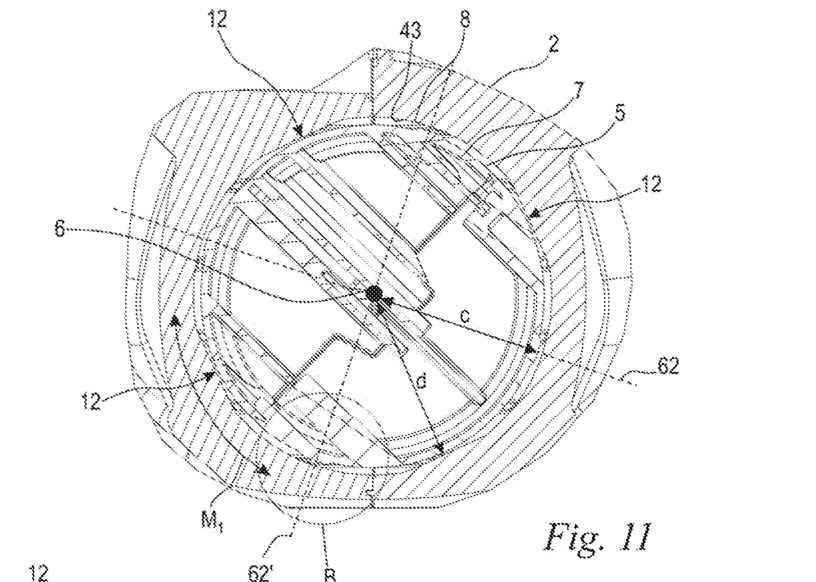
FIG. 11 in a sectional illustration along the arrows XI in FIG. 10 shows the handheld work apparatus.

As is shown in FIG. 11, the contours 13 can preferably be disposed in pairs on the handle 5. Two contours 13 of one contour pair lie on a straight line 62, 62' that perpendicularly intersects the pivot axis 6. As a result of the disposal of the contours 13 in pairs, the lug 7 having the receptacle 8 is braced symmetrically in relation to the pivot axis 6. Accordingly, tilting of the lug 7 in relation to the receptacle 8 can be avoided. In an analogous manner, the counter contours 15 can preferably also be disposed in pairs on the receptacle 8. FIG. 8 shows a sectional illustration of the handheld work apparatus according to FIG. 7, in which the disposal of the contour 13 on the lug 7 and of the counter contour 15 of the receptacle 8 in the operative position 21 is shown. The contour 13 of the handle 5 and the counter contour 15 are configured in such a manner that, in the operative position 21, 22 of the handle 5, a friction torque $M_2$ which acts about the pivot axis 6 and is transmittable is provided between the handle 5 and the housing 2. The friction torque $M_2$ here can act in both rotational directions of the handle 5. The contour 13 of the handle 5 and the counter contour 15 of the housing 2 in the operative position 21, 22 contact one another in such a manner that the handle 5 is braced in relation to the housing 2. The bracing between the handle 5 and the housing 2 enables the friction torque $M_2$ between the handle 5 and the housing 2 to be transmitted by way of the contour 13 and the counter contour 15. This has the consequence that the operator of the work apparatus 1, when rotating the handle 5, has to apply an increased torque in order for the friction torque $M_2$ to be overcome and for the handle 5 to be pivoted to the operative position 21, 22, or for the handle 5 to be pivoted from the operative position 21, 22 to the inoperative position 23.

Figure 10:
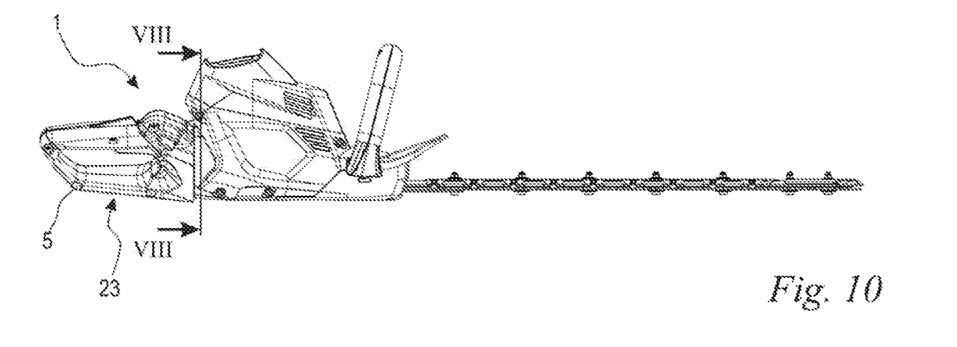
FIG. 10 in a lateral illustration shows the handheld work apparatus as per FIG. 1 in an inoperative position.
Figure 12:
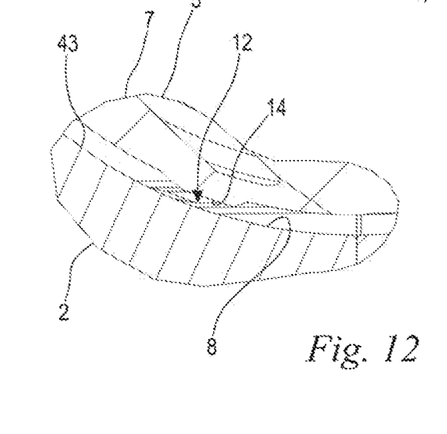
FIG. 12 in a fragmented sectional illustration shows the contour of the handle and the counter contour of the housing as per fragment B in FIG. 11.

As is shown in FIGS. 10 to 12, the contour 13 of the handle 5 and the counter contour 15 are configured in such a manner that, in the inoperative position 23 of the handle 5, a minimum friction torque $M_1$ which acts about the pivot axis 6 is provided between the handle 5 and the housing 2. The friction torque $M_2$ is greater than the friction torque $M_1$. In the embodiment, the contour 13 and the counter contour 15 are configured in such a manner that the contour 13 and the counter contour 15 are not in contact in the inoperative position 23. Accordingly, there is a bearing play 12 present between the handle 5 and the housing 2, wherein the bearing play 12 is in particular a radial bearing play. As a result, a friction torque cannot be transmitted between the contour 13 and the counter contour 15. The minimum friction torque $M_1$ between the contour 13 and the counter contour 15 is zero. The operator can pivot the handle 5 relative to the housing 2 with comparatively minor resistance. In an alternative embodiment of the work apparatus 1, it can be provided that the contour 13 and the counter contour 15 contact one another only slightly in the inoperative position 23, as a result of which an at least only minor friction torque $M_1$ is able to be transmitted between the contour 13 and the counter contour 15. This minor friction torque $M_1$ is also less than the friction torque $M_2$.

As is shown in FIG. 11, the contour 13 of the handle 5 in the inoperative position 23 possesses a spacing c from the pivot axis 6. The counter contour 15 of the housing 2 in the inoperative position 23 possesses a spacing d from the pivot axis 6. The spacing c is larger than the spacing d. In other words, all contours 13 lie on a circle, the diameter of the latter being larger than that of a circle that connects the counter contours with one another. When the contour 13 and the counter contour 15 lie in a straight line which is aligned so as to be radial to the pivot axis 6, this leads to the contour 13 and the counter contour 15 contacting one another and being braced in the process. Consequently, the friction torque $M_2$ can be transmitted between the contour 13 and the counter contour 15. The profile of the friction torque between the contour 13 and the counter contour 15 can be set in an arbitrary manner by the geometric configuration of the contour 13 and of the counter contour 15. In order to generate a uniform increase in the friction torque, the contour 13 and the counter contour are complanate at the ends thereof that, in the circumferential direction, lie facing the pivot axis 6. The friction torque can also be increased or reduced as a result of the number of pairs formed from the contour 13 and the counter contour 15. As a result of the configuration of the housing 2 in two parts, the housing 2 possesses an elasticity which, when the handle 5 and the housing 2 are braced, permits a partial elongation, or a displacement, respectively, of the housing parts in relation to one another. The housing 2 can furthermore be formed from a plastics material. The elasticity of the plastics material likewise causes an at least partial elongation of the housing 2. The clamping action between the contours 13 and the counter contours 15 is facilitated as a result.

The procedure of pivoting from the first operative position 21 to the second operative position 22 is described in more detail hereunder.

The handle 5 is in the first operative position 21 (FIGS. 1, 8, 9). The contour 13 and the counter contour 15 are in contact, as a result of which the housing 2 and the handle 5 are mutually braced. As a result of the bracing of the housing 2 and of the handle 5, a friction torque $M_2$ is able to be transmitted between the housing 2 and the handle 5. The blocking device 24 is in a locked position. Accordingly, in the circumferential direction in terms of the pivot axis 6 there is a form-fitting connection present between the housing 2 and the handle 5.

In order for the handle 5 to be released from the first operative position 21, the blocking device 24 is to be unlatched by pulling the retaining support 40, as a result of which the locking contour 34 is pulled out of the locking receptacle 35. The form-fitting connection in the circumferential direction of the pivot axis 6 is cancelled. The handle 5 is now to be rotated relative to the housing 2. To this end, the torque to be applied by the operator has to be greater than the friction torque $M_2$ transmittable between the contour 13 of the handle 5 and the counter contour 15 of the housing 2. The handle 5 is pivoted from the first operative position 21 to the inoperative position 23. The contour 13 and the counter contour 15 are no longer in contact. The bracing between the housing 2 and the handle 5 is cancelled. The bearing play 12 between the housing 2 and the handle 5 is present, as a result of which the transmittable friction torque $M_1$ between the contour 13 and the counter contour 15 is minimal. The blocking device 24 remains unlatched.

In order for the handle 5 to be pivoted further from the inoperative position 23 to the second operative position 22, the handle 5 has to be pivoted further relative to the housing 2. The contours 13 of the handle 5 and the counter contours 15 of the housing come into contact again here, as a result of which the transmittable friction torque $M_2$ is again increased. The operator realizes that the torque to be applied has to be increased in order for the handle 5 to be moved to the second operative position 22. The operator pivots the handle 5 relative to the housing 2 until the blocking device 24 latches again. Here, the blocking member 36 having the locking contour 34, by way of the spring element 39, is pushed into the locking receptacle 35 of the housing 2, as a result of which the form-fitting connection between the handle 5 and the housing 2 in the circumferential direction of the pivot axis 6 is re-established. The handle 5 is now fixed in relation to the housing 2 and is situated in the second operative position 22.

Figure 13:
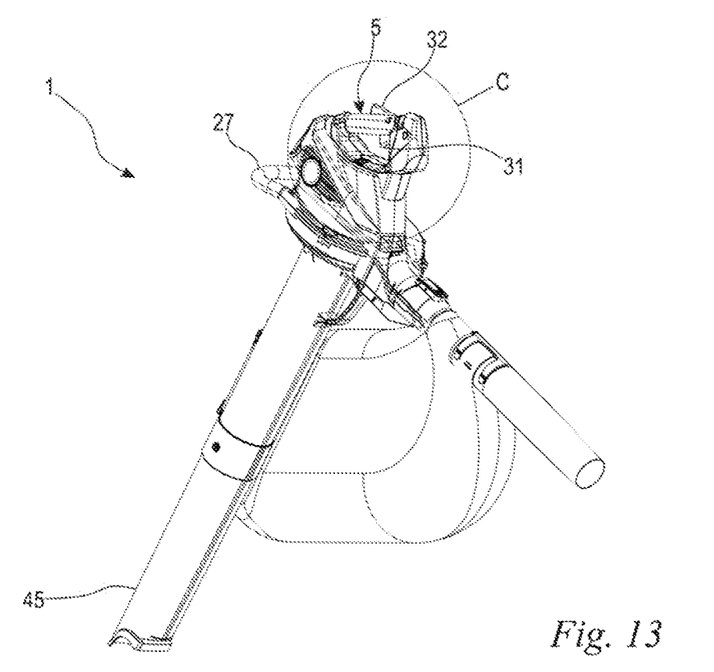
FIG. 13 in a perspective illustration shows a further embodiment of a work apparatus according to the disclosure in an operative position of the handle.

A further embodiment of the work apparatus 1 according to the disclosure is shown in FIGS. 13 to 17. As is shown in FIG. 13, the work apparatus 1 is configured as a suction shredder. The same reference signs refer to identical functional components. The work apparatus 1 includes a suction tube 45 which is disposed on a housing 2. A drive motor 3 which drives a fan wheel (not illustrated in more detail) so as to generate suction by way of an air flow at the open end of the suction tube 45 is provided in the housing 2. The work apparatus 1 furthermore includes a comminution device which is not shown and shreds and comminutes the material suctioned by way of the suction tube 45. A front handle 27 which is configured as a stirrup-shaped handle is disposed on the housing 2.

Figure 14:
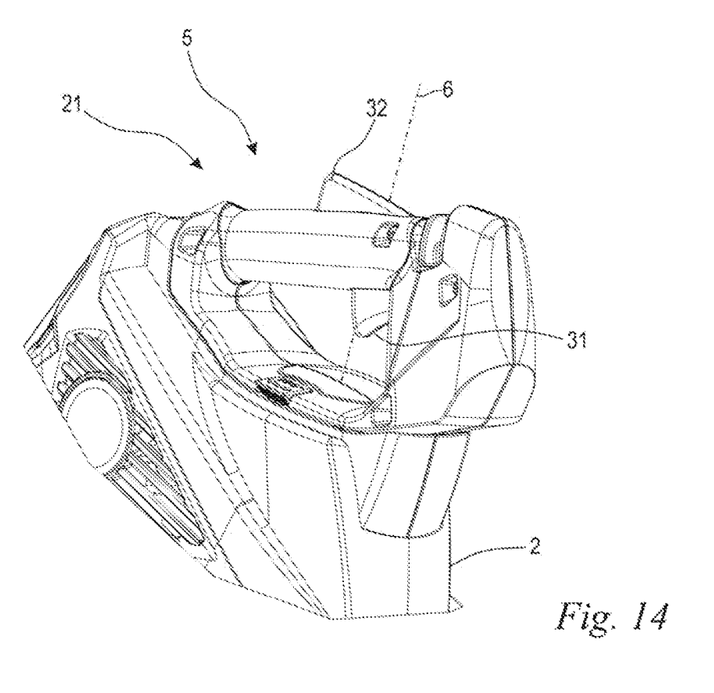
FIG. 14 in a perspective illustration shows the handle of the work apparatus as per fragment C of FIG. 13 in an operative position.

As is shown in FIG. 14, the work apparatus 1 includes a rear handle, hereunder referred to only as the handle 5, which is mounted on the housing 2 so as to be pivotable about the pivot axis 6. The handle 5 in FIG. 14 is disposed in the first operative position 21. The handle 5 is pivotable about the pivot axis 6 in two rotational directions to a second operative position 22 (FIG. 15).

The lug 7 is configured on the handle 5. The handle 5 is pivotably mounted by way of the lug 7 which is disposed in the receptacle 8 of the housing 2.

Figures 15, 16:
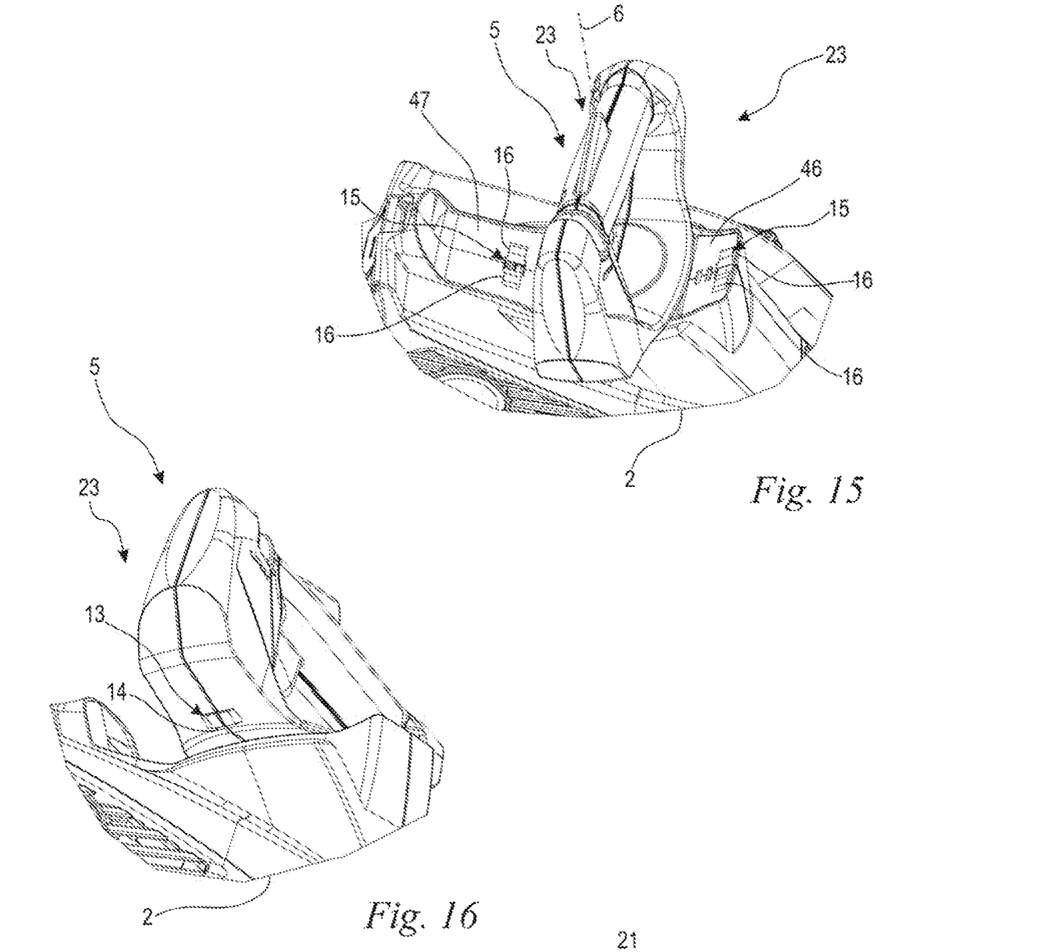
FIG. 15 in a perspective illustration from above shows the handle of the work apparatus as per FIG. 13 in an inoperative position.
FIG. 16 in a perspective illustration from below, shows the handle of the work apparatus as per FIG. 13 in an inoperative position.

As is shown in FIG. 15, the counter contour 15 is configured on the housing 2. The housing 2 in this embodiment includes two counter contours 15. One of the two counter contours 15 is configured on a first contact surface 46 of the housing 2. The first contact surface 46 runs so as to be inclined in relation to the pivot axis 6. The other of the two counter contours 15 is configured on a second contact surface 47 of the housing 2, wherein this contact surface 47 is likewise configured so as to be inclined in relation to the pivot axis 6. The oblique positioning of the contact surfaces 46, 47 in relation to the pivot axis 6 is conceived in such a manner that the handle 5, in relation to the housing 2, is braced substantially axially in the direction of the pivot axis 6 and also radially in relation to the pivot axis 6. It may be expedient for the contact surfaces 46, 47 to be configured in such a manner that the handle 5 is braced either axially in relation to the pivot axis 6 or radially in relation to the pivot axis 6. In this embodiment, the counter contours 15 are configured outside the receptacle 8 of the housing 2. A counter contour 15 is formed from two housing projections 16 which are disposed so as to be mutually spaced apart.

As is shown in FIG. 16, at least one contour 13 is disposed on a bottom side of the handle 5 that faces the housing 2. In the embodiment, a further contour 13 which is not illustrated and is disposed on the opposite side of the handle 5 in terms of the pivot axis 6 is provided. By disposing the contours 13 in pairs, tilting of the handle 5 when braced in relation to the housing 2 is avoided. The counter contour 13 is configured as a projection 14 on the bottom side of the handle 5. The ends of the projection 14 which lie in the circumferential direction of the pivot axis 6 are complanate. The contour 13 lies outside the lug 7 of the handle 5.

Figure 17:
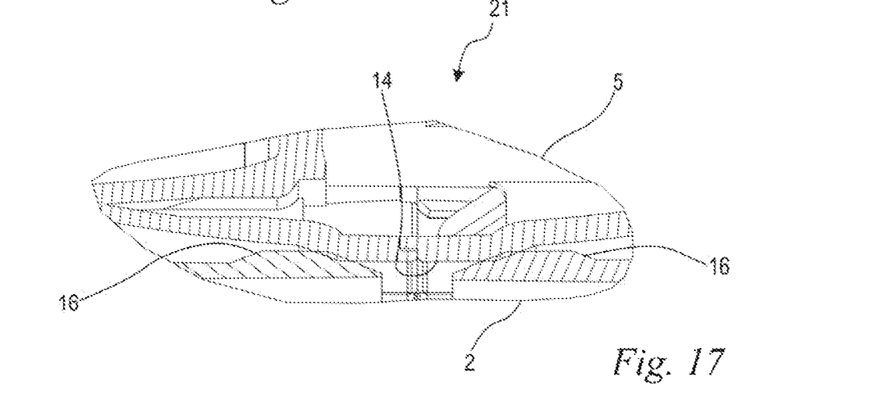
FIG. 17 in a fragmented sectional illustration shows the contour of the handle and the counter contour of the housing when engaged in an operative position; and, FIG. 18 in a fragmented sectional illustration along the arrows XVIII in FIG. 8 shows the contour and the counter contour of the work apparatus as per fragment D according to FIG. 8.

As is shown in FIG. 17, in the first operative position 21 of the handle 5, the contour 13 is braced in relation to the counter contour 15 of the housing 2. The projection 14 of the handle 5, in this position, lies between the two mutually spaced apart housing projections 16, wherein the projection 14 contacts the housing projections 16. The handle 5 and the housing 2 are mutually braced in a manner analogous to that described above. A transmittable friction torque $M_2$ is present between the projection 14 of the handle 5 and the housing projections 16. In order for the handle 5 to be released from the first operative position 21, this friction torque $M_2$ has to be overcome by a torque applied by the operator. The handle 5 is then situated in the inoperative position 23 (FIGS. 15, 16). The contour 13 and the counter contour 15 are not in contact in the inoperative position 23. The handle 5 is not braced in relation to the housing 2, as a result of which a minimum transmittable friction torque $M_1$ is present. In order for the handle 5 to be moved to the second operative position 22, an increased friction torque is again to be applied until the projection 14 latches between the two housing projections 16. In order for the handle 5 to be pivoted from the first operative position 21 to the second operative position 22, the handle has to be rotated by 180° about the pivot axis 6.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
    a housing;
    a drive motor for driving a tool;
    a handle disposed on said housing and mounted on said housing so as to be pivotable about a pivot axis, wherein said handle is pivotable to an operative position and to an inoperative position;
    a contour disposed on said handle;
    a counter contour disposed on said housing;
    said contour and said counter contour being configured such that when said handle is in said inoperative position, a minimum friction torque $M_1$, which acts about the pivot axis, is provided between said handle and said housing;
    said contour and said counter contour being further configured such that when said handle is in said operative position, said contour and said counter contour are operatively connected in such a manner that a further friction torque $M_2$, which acts about the pivot axis, is present between said handle and said housing;
    said further friction torque $M_2$ in said operative position is greater than said minimum friction torque $M_1$ in said inoperative position; and,
    wherein a bearing play is provided between said handle and said housing when said handle is in said inoperative position;
    and, said contour and said counter contour are operatively connected such that said housing and said handle are mutually braced when said handle is in said operative position.

2. The work apparatus of claim 1, wherein said bearing play is a radial bearing play with respect to the pivot axis.

3. The work apparatus of claim 1, wherein, when said handle is in said operative position, said bearing play is cancelled as a result of an interaction between said contour of said handle and said counter contour of said housing.

4. The work apparatus of claim 1, wherein said contour is a projection on said handle.

5. The work apparatus of claim 1, wherein said counter contour is a housing projection.

6. The work apparatus of claim 1, wherein said contour has a first contact face and said counter contour has a second contact face; said first contact face and said second contact face are configured to be operatively connected to one another; and, said first contact face of said contour and said second contact face of said counter contour are mutually configured such that a friction torque is increased when said handle is pivoted from said inoperative position to said operative position.

7. The work apparatus of claim 1 further comprising:
    a lug; and,
    wherein a mutual bearing of said housing and said handle is formed by said lug mounted in a receptacle.

8. The work apparatus of claim 7, wherein said lug is formed on said handle; and, said receptacle is formed on said housing.

9. The work apparatus of claim 7, wherein said contour is formed on said lug; and, said counter contour is formed on said receptacle.

10. The work apparatus of claim 1, wherein said contour is a first contour; and, the work apparatus further comprises at least one further contour disposed on said handle.

11. The work apparatus of claim 10, wherein each of said first contour and said at least one further contour are disposed so as to be mutually offset at a uniform angular spacing.

12. The work apparatus of claim 1, wherein said contour is a first contour; and, the work apparatus further comprises at least two further contours disposed on said handle.

13. The work apparatus of claim 1, wherein said contour is a first contour; and, the work apparatus further comprises at least three further contours disposed on said handle.

14. The work apparatus of claim 1, wherein said contour is a first contour; said counter contour is a first counter contour; the work apparatus further comprising at least one further contour and at least one further counter contour; and, wherein a quantity of said further contours corresponds to a quantity of said further counter contours.

15. The work apparatus of claim 1 further comprising:
    a blocking device configured to lock said handle in said operative position; and,
    said blocking device being configured separately from the contour and said counter contour.

16. The work apparatus of claim 15, wherein said contour and said counter contour are configured such that, when said handle is in said operative position and said blocking device is in a locking position, said contour and said counter contour mutually engage.

* * * * *

UNITED STATES PATENT AND TRADEMARK OFFICE
CERTIFICATE OF CORRECTION

| | | |
|---|---|---|
| PATENT NO. | : 11,642,773 B2 | |
| APPLICATION NO. | : 17/483263 | |
| DATED | : May 9, 2023 | |
| INVENTOR(S) | : Lars Bathke et al. | |

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace Figs. 1-3 with Figs. 1-3 as shown on the attached page.

Signed and Sealed this
Twenty-fifth Day of June, 2024

Katherine Kelly Vidal
*Director of the United States Patent and Trademark Office*

CERTIFICATE OF CORRECTION (continued)

(12) United States Patent
Bathke et al.

(10) Patent No.: US 11,642,773 B2
(45) Date of Patent: May 9, 2023

(54) HANDHELD WORK APPARATUS

(71) Applicant: Andreas Stihl AG & Co. KG, Waiblingen (DE)

(72) Inventors: Lars Bathke, Rudersberg (DE); Markus Oesterle, Althuette (DE); Jonathan Seiz, Stuttgart (DE); Verena Mann, Remshalden (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 0 days.

(21) Appl. No.: 17/483,263

(22) Filed: Sep. 23, 2021

(65) Prior Publication Data
US 2022/0088763 A1  Mar. 24, 2022

(30) Foreign Application Priority Data

Sep. 23, 2020 (EP) .................... 20197811

(51) Int. Cl.
*B25F 5/02* (2006.01)
*B23D 51/01* (2006.01)

(52) U.S. Cl.
CPC ............ *B25F 5/026* (2013.01); *B23D 51/01* (2013.01)

(58) Field of Classification Search
CPC .................... B23D 51/01; B25F 5/026
See application file for complete search history.

(56) References Cited

U.S. PATENT DOCUMENTS

| 4,432,139 | A | * | 2/1984 | Kohler | B27B 17/083 30/381 |
| 5,407,381 | A | * | 4/1995 | Schaefer | B24B 23/028 451/344 |
| 2013/0025688 | A1 | * | 1/2013 | Weiss | B25D 17/043 16/431 |
| 2014/0013542 | A1 | | 1/2014 | Wang | |
| 2014/0331809 | A1 | | 11/2014 | Mikula et al. | |

FOREIGN PATENT DOCUMENTS

| CN | 102145486 B | 12/2014 | |
| WO | 2018/168421 A1 | 9/2018 | |
| WO | WO2018168421 A1 * | 9/2018 | ........... B24B 23/00 |

* cited by examiner

Primary Examiner — Andrew M Tecco
Assistant Examiner — Nicholas E Igbokwe
(74) Attorney, Agent, or Firm — Walter Ottesen, P.A.

(57) ABSTRACT

The disclosure relates to a handheld work apparatus, wherein the work apparatus includes a housing, a drive motor for driving a tool, and a handle disposed on the housing. A contour is provided on the handle and a counter contour is provided on the housing. In the inoperative position of the handle, a minimum friction torque ($M_1$) which acts about the pivot axis is provided between the handle and the housing. In the operative position of the handle, the contour and the counter contour are operatively connected in such a manner that a further friction torque ($M_2$) which acts about the pivot axis is present between the handle and the housing. The further friction torque ($M_2$) in the operative position is greater than the minimum friction torque ($M_1$) in the inoperative position.

16 Claims, 7 Drawing Sheets

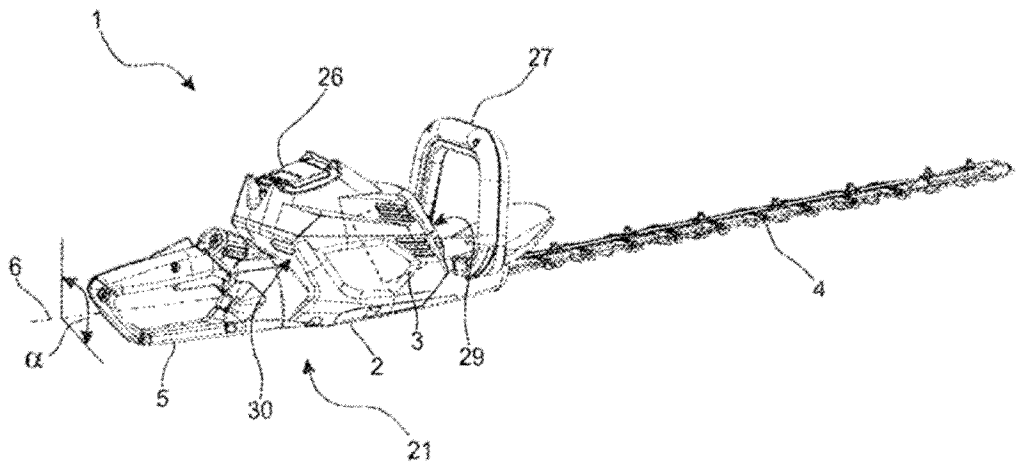

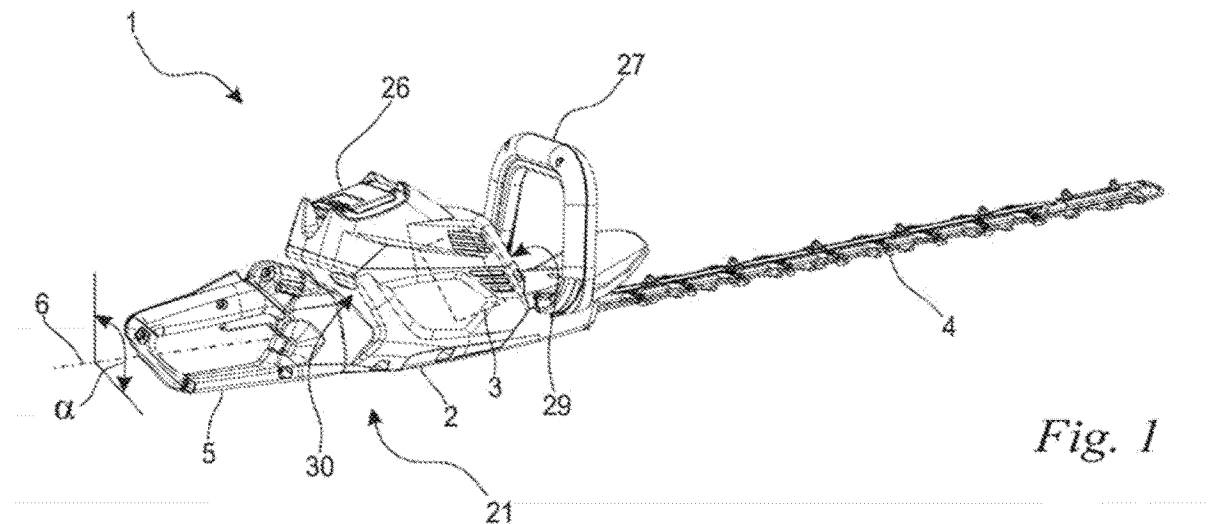
Fig. 1
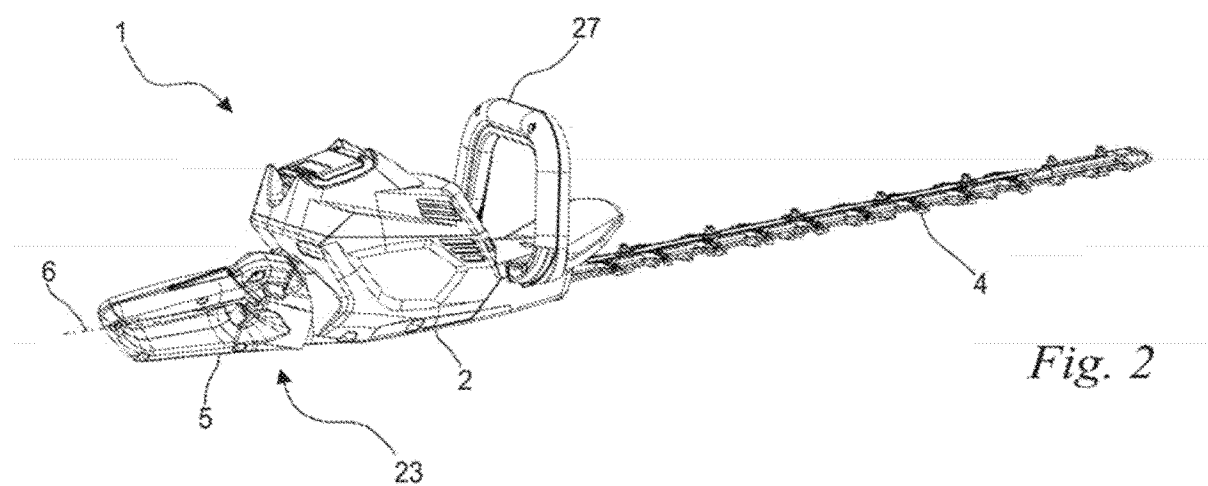
Fig. 2
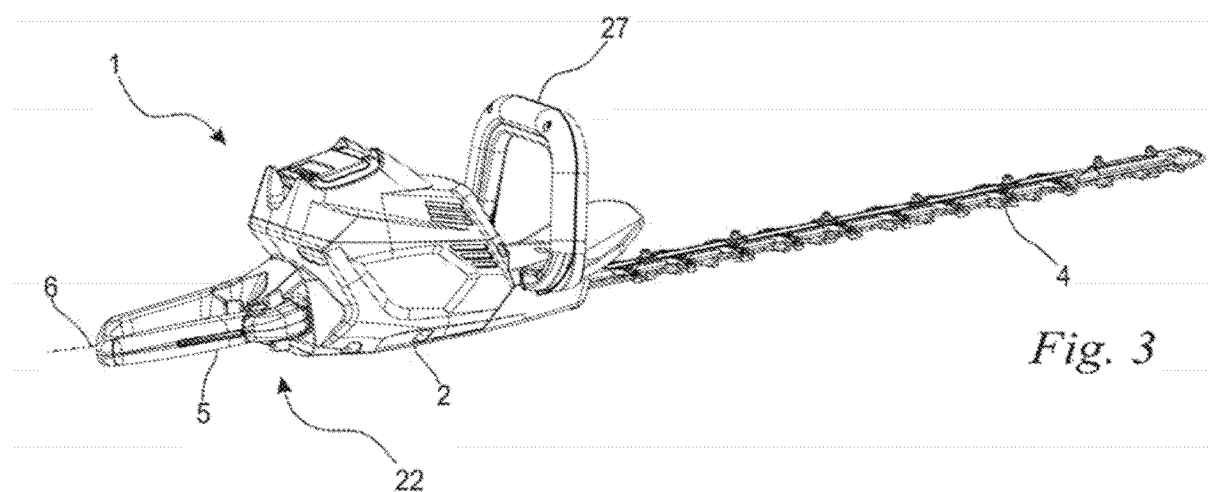
Fig. 3